United States Patent
Potter

(10) Patent No.: US 6,505,269 B1
(45) Date of Patent: Jan. 7, 2003

(54) DYNAMIC ADDRESSING MAPPING TO ELIMINATE MEMORY RESOURCE CONTENTION IN A SYMMETRIC MULTIPROCESSOR SYSTEM

(75) Inventor: Kenneth H. Potter, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/571,213

(22) Filed: May 16, 2000

(51) Int. Cl.[7] ............................................. G06F 12/00
(52) U.S. Cl. ...................... 711/20.2; 711/206; 711/210
(58) Field of Search ................................ 711/202, 205, 711/206, 207, 210, 212, 147, 150; 712/10, 11, 12, 22, 14, 16, 21, 19, 18; 709/200, 213, 400

(56) References Cited

U.S. PATENT DOCUMENTS

| | | | |
|---|---|---|---|
| 4,071,887 A | 1/1978 | Daly et al. | 364/200 |
| 4,096,571 A * | 6/1978 | Vander Mey | 711/151 |
| 4,400,768 A * | 8/1983 | Tomlinson | 712/2 |
| 4,404,557 A | 9/1983 | Grow | 340/825.05 |
| 4,495,617 A | 1/1985 | Ampulski et al. | 370/86 |
| 4,512,014 A | 4/1985 | Binz et al. | 370/84 |
| 4,530,091 A | 7/1985 | Crockett | 370/60 |
| 4,536,876 A | 8/1985 | Bahr et al. | 370/86 |
| 4,539,679 A | 9/1985 | Bux et al. | 370/88 |
| 4,543,630 A | 9/1985 | Neches | 364/200 |
| 4,549,291 A | 10/1985 | Renoulin et al. | 370/89 |
| 4,590,554 A | 5/1986 | Glazer et al. | 364/200 |
| 4,598,400 A | 7/1986 | Hillis | 370/60 |
| 4,604,742 A | 8/1986 | Hamada et al. | 370/89 |
| 4,609,920 A | 9/1986 | Segarra | 340/825.51 |
| 4,663,748 A | 5/1987 | Karbowiak et al. | 370/89 |
| 4,677,614 A | 6/1987 | Circo | 370/86 |
| 4,680,757 A | 7/1987 | Murakami et al. | 370/89 |
| 4,704,680 A | 11/1987 | Saxe | 364/200 |

(List continued on next page.)

OTHER PUBLICATIONS

Computer Architecture *The Anatomy of Modern Processors*, Pipeline Hazards, world wide web page http://ciips.ee.uwa.edu.au/~morris/CA406/pipe_hazard.htm, 1999, pp. 1–6.

Cisco Catalyst Workgroup Switch Version 3.0, web, http://www.cisco.com/warp/public/558/16.html, pp. 1–5.

Cisco VLAN Roadmap, web, http://www.cisco.com/warp/public/538/7.html, pp. 1–9.

IAC (SM) Newsletter Database (TM) Communications Industry Researchers, Broadband Networks and Applications, copyright 1995 Information Access Company, a Thomson Corporation Company, Section No. 16, vol. E; ISSN: 1059–0544, Headline, *Cisco Announces New Fast Ethernet Interface*, pp. 2–3.

(List continued on next page.)

*Primary Examiner*—Do Hyun Yoo
*Assistant Examiner*—Kimberly McLean
(74) *Attorney, Agent, or Firm*—Cesari and McKenna, LLP

(57) ABSTRACT

A dynamic address mapping technique eliminates contention to memory resources of a symmetric multiprocessor system having a plurality of processors arrayed as a processing engine. The technique defines two logical-to-physical address mapping modes that may be simultaneously provided to the processors of the arrayed processing engine to thereby present a single contiguous address space for accessing individual memory locations, as well as memory strings, within the memory resources. These addressing modes include a bank select mode and a stream mode.

20 Claims, 10 Drawing Sheets

U.S. PATENT DOCUMENTS

| | | | |
|---|---|---|---|
| 4,709,327 A | 11/1987 | Hillis et al. | 364/200 |
| 4,709,364 A | 11/1987 | Hasegawa et al. | 370/85 |
| 4,713,807 A | 12/1987 | Caves et al. | 370/94 |
| 4,746,920 A | 5/1988 | Nellen et al. | 340/825.14 |
| 4,747,130 A | 5/1988 | Ho | 379/269 |
| 4,754,395 A | 6/1988 | Weisshaar et al. | 364/200 |
| 4,771,423 A | 9/1988 | Ohya et al. | 370/86 |
| 4,773,038 A | 9/1988 | Hillis et al. | 364/900 |
| 4,791,641 A | 12/1988 | Hillis | 371/38 |
| 4,805,091 A | 2/1989 | Thiel et al. | 364/200 |
| 4,805,167 A | 2/1989 | Leslie et al. | 370/84 |
| 4,809,202 A | 2/1989 | Wolfram | 364/578 |
| 4,814,762 A | 3/1989 | Franaszek | 340/825.79 |
| 4,815,110 A | 3/1989 | Benson et al. | 375/107 |
| 4,833,468 A | 5/1989 | Larson et al. | 340/825.8 |
| 4,864,559 A | 9/1989 | Perlman | 370/60 |
| 4,870,568 A | 9/1989 | Kahle et al. | 364/200 |
| 4,918,600 A * | 4/1990 | Harper, III | 711/157 |
| 4,922,418 A | 5/1990 | Dolecek | 364/200 |
| 4,922,486 A | 5/1990 | Lidinsky et al. | 370/60 |
| 4,926,446 A | 5/1990 | Grover et al. | 375/109 |
| 4,930,121 A | 5/1990 | Shiobara | 370/85.4 |
| 4,949,239 A | 8/1990 | Gillett, Jr. et al. | 364/200 |
| 4,954,988 A | 9/1990 | Robb | 365/189.02 |
| 4,965,717 A | 10/1990 | Cutts, Jr. et al. | 364/200 |
| 4,993,028 A | 2/1991 | Hillis | 371/39.1 |
| 5,014,265 A | 5/1991 | Hahne et al. | |
| 5,018,137 A | 5/1991 | Backes et al. | 370/85.13 |
| 5,027,350 A | 6/1991 | Marshall | 370/85.13 |
| 5,067,078 A | 11/1991 | Talgam et al. | 395/400 |
| 5,070,446 A | 12/1991 | Salem | 395/500 |
| 5,088,032 A | 2/1992 | Bosack | 395/200 |
| 5,093,801 A | 3/1992 | White et al. | 364/726 |
| 5,111,198 A | 5/1992 | Kuszmaul | 340/825.52 |
| 5,113,510 A | 5/1992 | Hillis | 395/425 |
| 5,117,420 A | 5/1992 | Hillis et al. | 370/60 |
| 5,129,077 A | 7/1992 | Hillis | 395/500 |
| 5,148,547 A | 9/1992 | Kahle et al. | 395/800 |
| 5,151,996 A | 9/1992 | Hillis | 395/800 |
| 5,157,663 A | 10/1992 | Major et al. | 371/9.1 |
| 5,175,865 A | 12/1992 | Hillis | 395/800 |
| 5,212,773 A | 5/1993 | Hillis | 395/200 |
| 5,222,216 A | 6/1993 | Parish et al. | 395/275 |
| 5,222,237 A | 6/1993 | Hillis | 395/650 |
| 5,224,099 A | 6/1993 | Corbalis et al. | |
| 5,247,613 A | 9/1993 | Bromley | 395/200 |
| 5,247,645 A * | 9/1993 | Mirza | 711/5 |
| 5,247,694 A | 9/1993 | Dahl | 395/800 |
| 5,255,291 A | 10/1993 | Holden et al. | 375/111 |
| 5,261,105 A | 11/1993 | Pottet et al. | 395/725 |
| 5,265,207 A | 11/1993 | Zak et al. | 395/200 |
| 5,274,631 A | 12/1993 | Bhardwaj | 370/60 |
| 5,280,470 A | 1/1994 | Buhrke et al. | |
| 5,289,156 A | 2/1994 | Ganmukhi | 340/146.2 |
| 5,295,258 A | 3/1994 | Jewett et al. | 395/575 |
| 5,301,310 A | 4/1994 | Isman et al. | 395/575 |
| 5,317,726 A | 5/1994 | Horst | 395/575 |
| 5,325,487 A | 6/1994 | Au et al. | 395/250 |
| 5,331,637 A | 7/1994 | Francis et al. | 370/54 |
| 5,349,680 A | 9/1994 | Fukuoka | 395/800 |
| 5,353,283 A | 10/1994 | Tsuchiya | 370/60 |
| 5,355,492 A | 10/1994 | Frankel et al. | 395/700 |
| 5,357,612 A | 10/1994 | Alaiwan | 395/200 |
| 5,359,592 A | 10/1994 | Corbalis et al. | |
| 5,361,256 A | 11/1994 | Doeringer et al. | 370/60 |
| 5,361,363 A | 11/1994 | Wells et al. | 395/800 |
| 5,367,692 A | 11/1994 | Edelman | 395/800 |
| 5,388,214 A | 2/1995 | Leiserson et al. | 395/200 |
| 5,388,262 A | 2/1995 | Hillis | 395/650 |
| 5,390,298 A | 2/1995 | Kuszmaul et al. | 395/200 |
| 5,394,402 A | 2/1995 | Ross | 370/94.1 |
| 5,394,553 A * | 2/1995 | Lee | 712/14 |
| 5,404,296 A | 4/1995 | Moorhead | 364/421 |
| 5,404,562 A | 4/1995 | Heller et al. | 395/800 |
| 5,410,723 A | 4/1995 | Schmidt et al. | 395/800 |
| 5,414,704 A | 5/1995 | Spinney | 370/60 |
| 5,428,761 A | 6/1995 | Herlihy et al. | 395/425 |
| 5,428,803 A * | 6/1995 | Chen | 712/6 |
| 5,440,752 A | 8/1995 | Lentz et al. | 395/800 |
| 5,442,633 A | 8/1995 | Perkins et al. | 370/94.1 |
| 5,455,932 A | 10/1995 | Major et al. | 395/489 |
| 5,473,607 A | 12/1995 | Hausman et al. | 370/85.13 |
| 5,475,856 A | 12/1995 | Kogge | 395/800 |
| 5,479,624 A * | 12/1995 | Lee | 711/1 |
| 5,485,627 A | 1/1996 | Hillis | 395/800 |
| 5,499,384 A | 3/1996 | Lentz et al. | 395/821 |
| 5,500,860 A | 3/1996 | Perlman et al. | 370/85.13 |
| 5,511,168 A | 4/1996 | Perlman et al. | 395/200.15 |
| 5,530,809 A | 6/1996 | Douglas et al. | 395/200.2 |
| 5,535,408 A | 7/1996 | Hillis | 395/800 |
| 5,561,669 A | 10/1996 | Lenney et al. | 370/60.1 |
| 5,561,784 A * | 10/1996 | Chen | 711/157 |
| 5,566,170 A | 10/1996 | Bakke et al. | 370/60 |
| 5,568,380 A | 10/1996 | Brodnax et al. | 364/184 |
| 5,583,996 A | 12/1996 | Tsuchiya | 395/200.15 |
| 5,600,644 A | 2/1997 | Chang et al. | 370/404 |
| 5,612,959 A | 3/1997 | Takase et al. | 370/390 |
| 5,613,136 A | 3/1997 | Casavant et al. | 395/800 |
| 5,617,421 A | 4/1997 | Chin et al. | 370/402 |
| 5,617,538 A | 4/1997 | Heller | 395/200.02 |
| 5,621,885 A | 4/1997 | Del Vigna, Jr. | 395/182.11 |
| 5,627,965 A | 5/1997 | Liddell et al. | 395/185.01 |
| 5,633,858 A | 5/1997 | Chang et al. | 370/255 |
| 5,633,866 A | 5/1997 | Callon | 370/397 |
| 5,673,423 A | 9/1997 | Hillis | 395/553 |
| 5,684,800 A | 11/1997 | Dobbins et al. | 370/401 |
| 5,710,814 A | 1/1998 | Klemba et al. | 380/9 |
| 5,724,600 A * | 3/1998 | Ogi | 712/11 |
| 5,740,171 A | 4/1998 | Mazzola et al. | 370/392 |
| 5,742,604 A | 4/1998 | Edsall et al. | 370/401 |
| 5,748,936 A | 5/1998 | Karp et al. | 395/394 |
| 5,748,963 A | 5/1998 | Karp et al. | 395/394 |
| 5,751,955 A | 5/1998 | Sonnier et al. | 395/200.19 |
| 5,764,636 A | 6/1998 | Edsall | 370/401 |
| 5,781,715 A | 7/1998 | Sheu | 395/182.02 |
| 5,781,753 A | 7/1998 | McFarland et al. | 395/394 |
| 5,787,243 A | 7/1998 | Stiffler | 395/182.11 |
| 5,787,255 A | 7/1998 | Parlan et al. | 395/200.63 |
| 5,796,732 A | 8/1998 | Mazzola et al. | |
| 5,796,740 A | 8/1998 | Perlman et al. | 370/401 |
| 5,812,811 A | 9/1998 | Dubey et al. | 395/392 |
| 5,818,842 A | 10/1998 | Burwell et al. | 370/397 |
| 5,828,844 A | 10/1998 | Civanlar et al. | 395/200.58 |
| 5,832,291 A | 11/1998 | Rosen et al. | 395/800.11 |
| 5,838,915 A | 11/1998 | Klausmeier et al. | 395/200.45 |
| 5,852,607 A | 12/1998 | Chin | 370/401 |
| 5,860,086 A | 1/1999 | Crump et al. | 711/109 |
| 5,872,963 A | 2/1999 | Bitar et al. | 395/580 |
| 5,898,686 A | 4/1999 | Virgile | 370/381 |
| 5,909,441 A | 6/1999 | Alexander, Jr. et al. | 370/395 |
| 5,909,550 A | 6/1999 | Shankar et al. | 395/200.57 |
| 5,941,988 A | 8/1999 | Bhagwat et al. | 713/201 |
| 5,953,512 A | 9/1999 | Cai et al. | 395/381 |
| 5,960,211 A | 9/1999 | Schwartz et al. | 395/800.22 |
| 6,035,422 A | 3/2000 | Hohl et al. | 714/35 |
| 6,067,569 A | 5/2000 | Khaki et al. | 709/224 |

OTHER PUBLICATIONS

*IAC (SM) Newsletter Database (TM) Communications Industry Researchers, Broadband Networks and Applications,* copyright 1995 Information Access Company, a Thomson Corporation Company, Section No. 16, vol. 3; ISSN: 1059–0544, Headline, *Cisco Announces Token–Ring Switching Products,* pp. 4–5.

*Cisco 7000 Series Gains Fast Ethernet Interface, Becomes Only Router Family to Support Three High–Speed Network Types,* web, http://www.cisco.com/warp/public/146/199.html pp. 1–2.

*ISL Functional Specification,* web, http://www.cisco.com/warp/public/741/4.htm, pp. 1–4.

*Cisco–Catalyst 5000 Software Release 2.1 Feature Set,* web, http://www.cisco.com/warp/public/729/c5000/426_pp.htm pp. 1–9.

*IEEE Standard Project P802.1Q, Draft Standard for Virtual Bridged Local Area Networks,* Copyright by the Institute of Electrical and Electronics Engineers, Inc., Feb. 28, 1997, pp. 1–88.

*Draft Standard P.802.1Q/D10, IEEE Standards for Local and Metropolitan Area Networks: Virtual Bridged Local Area Networks,* Copyright by the Institute of Electrical and Electronics Engineers, Inc., Mar. 22, 1997, pp. 1–212.

*ISL Configurations for Cisco IOS and the Catalyst 5000,* web, http://www.cisco.com/warp/public/741/8.html, pp. 1–8.

*Dynamic Inter–Switch Link Protocol,* 2.2 Configuration Note, pp. 2–6.

*Virtual LANs,* Catalyst 2820 Series and Catalyst 1900 Series Enterprise Edition Software Configuration Guide, Chapter 2, pp. 2–1–2–49.

*Configuring VTP and Virtual LANs,* Catalyst 5000 Series Software Configuration Guide, Chapter 13, pp. 13–1–13–24.

IEEE 1149.1 Device Architecture, *http://www.asset–intertech.com/homepage/bscantutr/arch.htm,* pp. 1–3, 1998.

IEEE 1149.1 Device Architecture (continued), Using the Instruction Register (IR), *http://www.asset–intertech.com/homepage/bscantutr/arch2.htm#Using IR,* pp. 1–4, 1998.

The Principle of Boundary–Scan Architecture, *http://www.asset–intertech.com/homepage/bscantutr/principl.htm,* pp. 1–4, 1998.

IEEE 1149.1 Device Architecture (continued), The Test Access Port (TAP), http://www.asset–intertech.com/homepage/bscantutr/arch3.htm#TAP, pp. 1–3, 1998.

Digital Systems Testing and Testable Design, Miron Abramovici, et al., Computer Science Press, pp. 342–409, Copyright 1990.

World Wide Web page *http://www.synopsys.com/products/analysis/primtime_ds.html, Prime Time,* Jul. 12, 1999, pp. 1–7.

World Wide Web page *http://www.synopsys.com/products/analysis/primtime_cs.html, Prime Time: Full–Chip, Gate–Level Static Timing Analysis,* Jul. 12, 1999, pp. 1–2.

World Wide Web page *http://www.synopsys.com/products/analysis/sta_wp.html, Static Timing Verification: Methodology Overview,* Jul. 12, 1999, pp. 1–13.

World Wide Web page *http://www.synopsys.com/products/analysis/pt_tech_bgr.html, Prime Time Full–Chip Static Timing Analyzer,* Jul. 12, 1999, pp. 1–17.

Pankaj Gupta and Nick McKeown, Packet Classification on Multiple Fields.

Dawson R. Engler and M. Frans Kaashoek, DPF: Fast, Flexible Message Demultiplexing using Dynamic Code Generation, 1996, pp. 53–59.

T.V. Lakshman and D. Stiliadis, High–Speed Policy–based Packet Forwarding Using Efficient Multi–dimensional Range Matching, 1998, pp. 203–214.

\* cited by examiner

TOTAL MEM CAPACITY = 16 MB
BANK CAPACITY = 4 MB

BANK SELECT MODE:                32 OR 64-BIT ACCESS

BANK SEL [1:0] = ADDRESS [23:22]
    I/F SEL   [0]  = ADDRESS [24]
    ROW     [8:0] = ADDRESS [21:11]
    COLUMN  [8:0] = ADDRESS [10:2]

STREAM MODE (2):                 32-BIT ACCESS

BANK SEL [1:0] = ADDRESS [3:2]
    I/F SEL   [0]  = ADDRESS [4]
    ROW     [8:0] = ADDRESS [24:14]
    COLUMN  [8:0] = ADDRESS [13:5]

STREAM MODE (0):                 32-BIT ACCESS

BANK SEL [1:0] = ADDRESS [4:3]
    I/F SEL   [0]  = ADDRESS [2]
    ROW     [8:0] = ADDRESS [24:14]
    COLUMN  [8:0] = ADDRESS [13:5]

STREAM MODE (4):                 32-BIT ACCESS

BANK SEL [1:0] = ADDRESS [3:2]
    I/F SEL   [0]  = ADDRESS [24]
    ROW     [8:0] = ADDRESS [23:13]
    COLUMN  [8:0] = ADDRESS [12:4]

FIG. 9

DYNAMIC ADDRESSING MAPPING TO ELIMINATE MEMORY RESOURCE CONTENTION IN A SYMMETRIC MULTIPROCESSOR SYSTEM

FIELD OF THE INVENTION

The present invention generally relates to computer systems and, more specifically, to a dynamic address mapping technique of a symmetric multiprocessor system.

BACKGROUND OF THE INVENTION

A systolic array provides a common approach for increasing processing capacity of a computer system when a problem can be partitioned into discrete units of works. In the case of a one dimensional (1-D) systolic array comprising a single "row" of processing elements or processors, each processor in the array is responsible for executing a distinct set of instructions on input data before passing it to a next element of the array. To maximize throughput, the problem is divided such that each processor requires approximately the same amount time to complete its portion of the work. In this way, new input data can be "pipelined" into the array at a rate equivalent to the processing time of each processor, with as many units of input data being processed in parallel as there are processors in the array. Performance can be improved by adding more elements to the array as long as the problem can continue to be divided into smaller units of work. Once this dividing limit has been reached, processing capacity may be further increased by configuring multiple 1-D rows or pipelines in parallel, with new input data allocated to the first processor of a next pipeline of the array in sequence.

In a symmetric multiprocessor system configured as a multidimensional systolic array, processors in the same position ("column") of each pipeline execute the same instructions on their input data. For a large class of applications including data networking, the processors in the same column access the same data structures. For example, a common table indicating a data communication queue must be accessible by all processors in the same column since it is not possible to know in advance which pipeline has the correct table for this input data. Therefore, access to a common memory is required among the processors of the same column.

To avoid contention and thus stalling by the processors, accesses to the common memory are scheduled. Since each processor of a column executes the same instruction code and therefore accesses the same tables in memory, the pipelines of the array are "skewed". In this context, skewing denotes configuring the array such that a first processor of a first pipeline finishes accessing a particular memory just as a second processor of a second pipeline starts to access the same memory. Skewing may be realized by loading new input data into each pipeline of the array in sequence. In this way, the minimum time between input data, and therefore maximum system throughput, is bounded by the time a particular processor, such as the first processor, in a column consumes ("ties up") a particular memory resource that the second processor in the same column requires.

For an application utilizing low cost, high-density synchronous dynamic random access memory (SDRAM) resources, the granularity of memory resource contention is typically a bank. A typical SDRAM module has four (4) banks, each containing a fixed one-quarter of the total memory. When a bank is accessed, it cannot be accessed again for a certain period of time (e.g., 7 cycles at 100 MHz). The SDRAM memory resource can support overlapping accesses to each of its banks, where new accesses can be issued every 2 cycles, but only one access at a time per bank is possible. More banks can be added by providing more SDRAM modules to allow more simultaneous accesses to different locations in the memory, but the time needed to access a table within a bank still dictates the maximum throughput of the multiprocessor array. At lower speeds such as, e.g., 100 MHz, the minimum time for accessing a typical entry in a table is approximately seven (7) cycles (for a maximum system throughput of 14.3 million data units per second). However, to access relatively long table entries (e.g., entries containing words), the time that a bank is tied up increases, thereby directly decreasing system throughput.

Therefore, an object of the present invention is to provide a technique that increases throughput in a multidimensional systolic array having SDRAM memory module resources.

Another object of the present invention is to provide a technique that enables fast and efficient accesses by processors of a symmetric multiprocessor system to contiguous storage locations of a memory resource.

SUMMARY OF THE INVENTION

The present invention comprises a dynamic address mapping technique that eliminates contention to memory resources of a symmetric multiprocessor system having a plurality of processors arrayed as a processing engine. The inventive technique defines two logical-to-physical address mapping modes that may be simultaneously provided to the processors of the arrayed processing engine to thereby present a single contiguous address space for accessing individual memory locations, as well as a plurality of memory locations organized as a "memory string", within the memory resources. As described herein, these addressing modes include a bank select mode and a stream mode.

According to an aspect of the invention, the bank select mode uses high-order address bits to select a bank of a memory resource for access. A data structure, such as a table having relatively short entries, is placed within a single bank of memory and addressed using the bank select mode. Assume that the bank is "tied up" for 7 cycles during an access to a single location in the table memory. A first processor in a first pipeline of the arrayed processing engine can access a random location within this table at absolute time N. As long as the skew between pipelines is as large as the time that the bank is tied up for a single access (i.e., 7 cycles), a second processor in the same column of a second pipeline can execute the same instructions (skewed by the 7 cycles). In this case, the second processor may access the same or a different location within the table (and bank) at time N+7 without contending with the first processor. That is, the first processor in the first pipeline may be busy accessing a different table in another bank at time N+7.

On the other hand, the stream mode uses low-order address bits to select a bank within a memory resource. Here, the data structure is preferably a table having relatively long entries, each containing words that are accessed over a plurality of cycles. According to this aspect of the present invention, the long entries are spread across successive banks and stream mode addressing functions to map each successive word to a different bank. By defining the table entry width as a multiple of the access width times the number of banks, contentions can be eliminated.

For example, a processor of a first pipeline can access a first word of a random entry from a table resident in Bank 0 at absolute time N; that processor may then access a second word of the same entry from Bank 1 at time N+7. This process may continue with the processor "seeing" the entire entry as a contiguous address space. A corresponding processor of a next pipeline is skewed by 7 cycles and can execute the same instructions for accessing the same or different entry from the same table. Here, a first word is accessed from Bank 0 at time N+7, a second word is accessed from Bank 1 at time N+14, etc., without contention. It should be noted that the time between accesses to different banks can be as low as 2 cycles and is unrelated to the time that a bank is tied up (e.g., 7 cycles). In this staggered configuration, the processor of the first pipeline can access Bank 1 as early as N+2 rather than N+7; likewise, the processor in the next pipeline may access Bank 1 as early as N+9 rather than N+14.

In the illustrative embodiment, the two types of tables (i.e., one with short entries and the other with long entries) may reside within the same physical memory. For example, if the bank size is 2 MB, the lower portion of each bank can be used for holding tables to be accessed in bank select mode, whereas the upper portion of each bank can be used for holding tables to be accessed in stream mode. If a bank select mode table is larger than a reserved size within a bank, additional address mapping can be performed to make it appear contiguous, if required. The processor may dynamically, on a per instruction basis, indicate the address mapping mode by way of a special field in an opcode or by assertion of a bit within an address generated by the processor.

Advantageously, the inventive technique provides a means for eliminating contention among synchronized parallel processors for various table organizations in a manner that achieves maximum system throughput. Bank select addressing mode, by itself, has severe contention problems for direct long accesses and additional processor overhead if a processor must apportion long accesses into multiple shorter accesses. Moreover, an address mapping technique that exclusively uses low-order address bits to select a bank is non-deterministic, resulting in contention and cannot be tuned.

While software may perform mapping to the banks via processor instructions, the novel address mapping technique has the advantage that it is transparent to real-time software and eliminates processor instructions that may be wasted by dynamically computing non-contiguous memory addresses. The technique also enables use of a single processor instruction that specifies the amount of data to be read or written, which is not possible if software must perform the address mapping for each access. In addition, the technique supports tables of various widths that can be accessed directly by software without reducing system throughput and without requiring system software to dynamically compute memory addresses for what should be viewed as contiguous memory. The inventive technique also allows the use of SDRAM memory resources where significantly more expensive, and lower density, SSRAM might otherwise be required.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 9 illustrates logical-to-physical computations in accordance with the bank select and stream modes of addressing of the present invention.

DETAILED DESCRIPTION OF AN ILLUSTRATIVE EMBODIMENT

Figure 1:
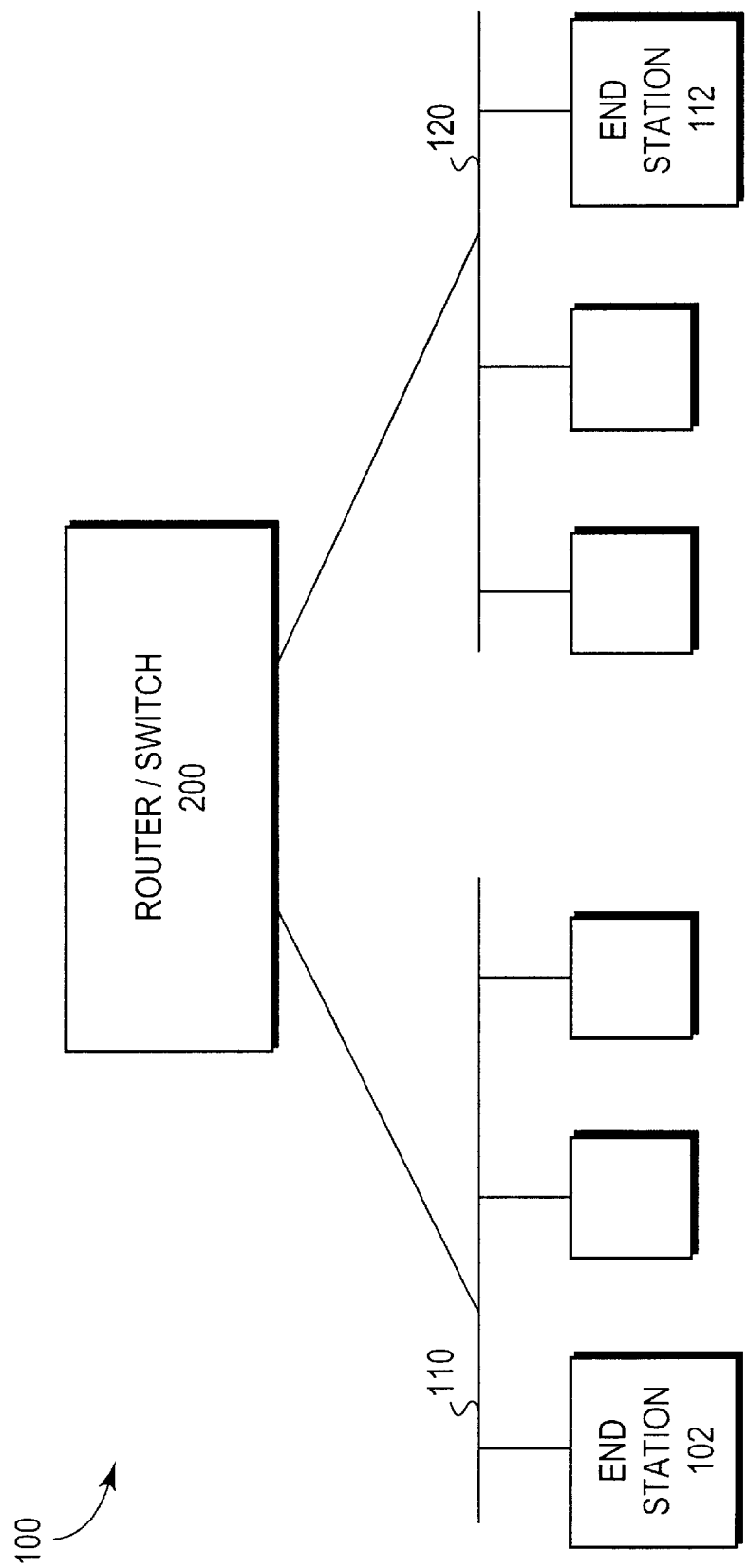
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating stations according to a predefined protocol. For the illustrative embodiment described herein, the predefined protocol is the Internet protocol (IP), although the invention could be implemented with other protocols, such as the Internet Packet Exchange, AppleTalk or DECNet protocols.

Figure 2:
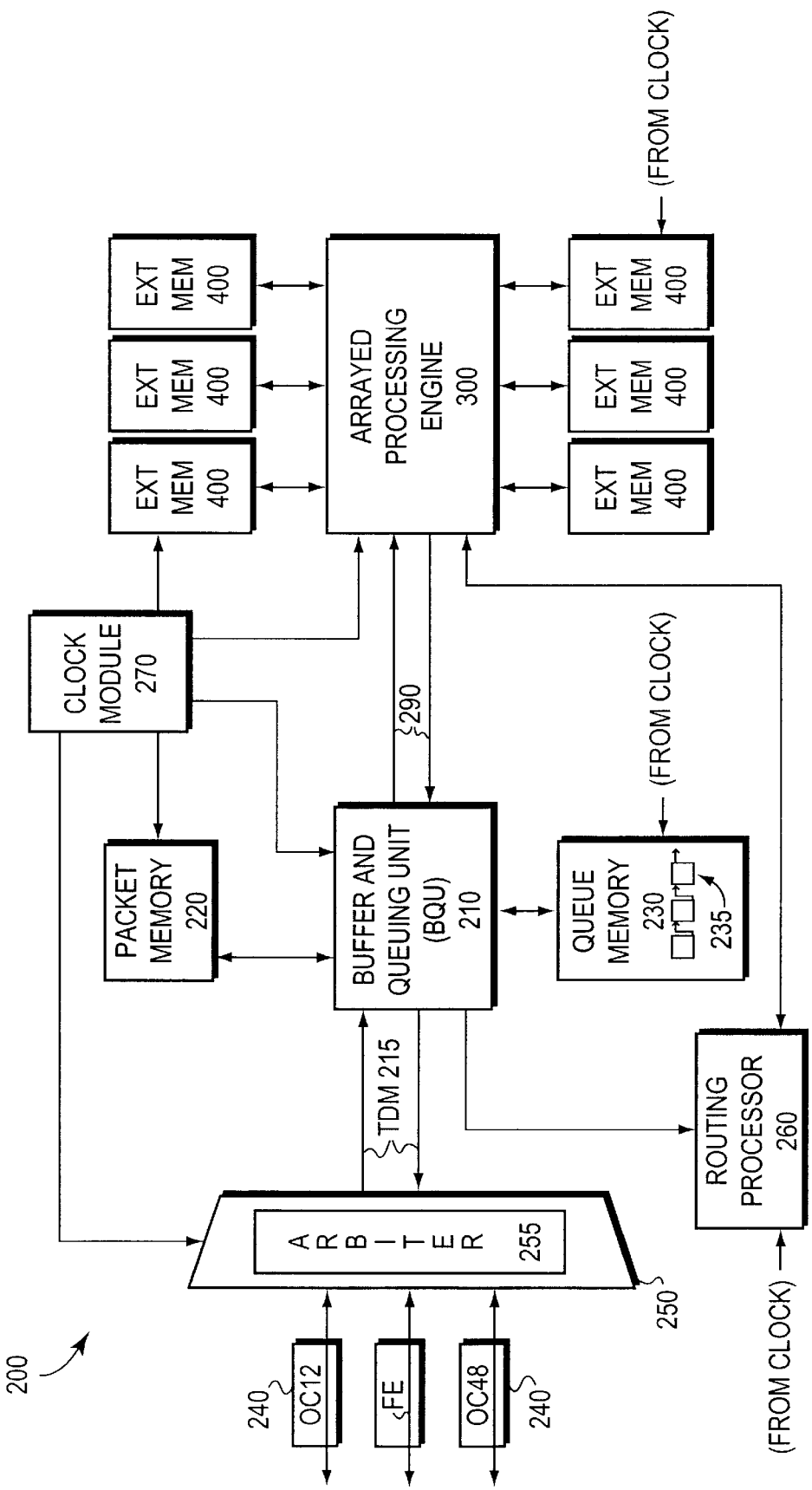
FIG. 2 is a schematic block diagram of intermediate station, such as a network switch, having an arrayed processing engine coupled to a memory partitioned into a plurality of external memory resources that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the architecture described herein is the ability to program the station for execution of layer 2, layer 3 or higher-layer operations. Operation of the switch will be described with respect to IP switching of packets, although the switch may respect to IP switching of packets, although the switch may be programmed for other applications, such as data encryption.

The switch 200 comprises a plurality of interconnected components including an arrayed processing engine 300, various memories, queuing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of, e.g., 200 megahertz (i.e., 5 nanosecond clock cycles) and globally distributed them via clock lines to the components of the switch.

The memories generally comprise random access memory storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 300 is coupled to a memory partitioned into a plurality of external memory (Ext Mem) resources 400. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250 having an arbiter 255. The line cards 240 may comprise, e.g., OC12, OC48 and Fast Ethernet (FE) ports, each of which includes conventional interface circuitry that may incorporate the signal, electrical and mechanical characteristics, and interchange circuits, needed to interface with the physical media and protocols running over that media. A typical configuration of the switch may include many input/output channels on these interfaces, each of which is associated with one queue 235 in the queue memory 230. The processing engine 300 generally functions as a switching processor that modifies packets and/or headers as the BQU 210 implements queuing operations.

A routing processor 260 executes conventional routing protocols for communication directly with the processing engine 300. The routing protocols generally comprise topological information exchanges between intermediate stations to determine preferred paths through the network based on, e.g., destination IP addresses. These protocols provide information used by the processor 260 to create and maintain routing tables. The tables are loaded into the external partitioned memories 400 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
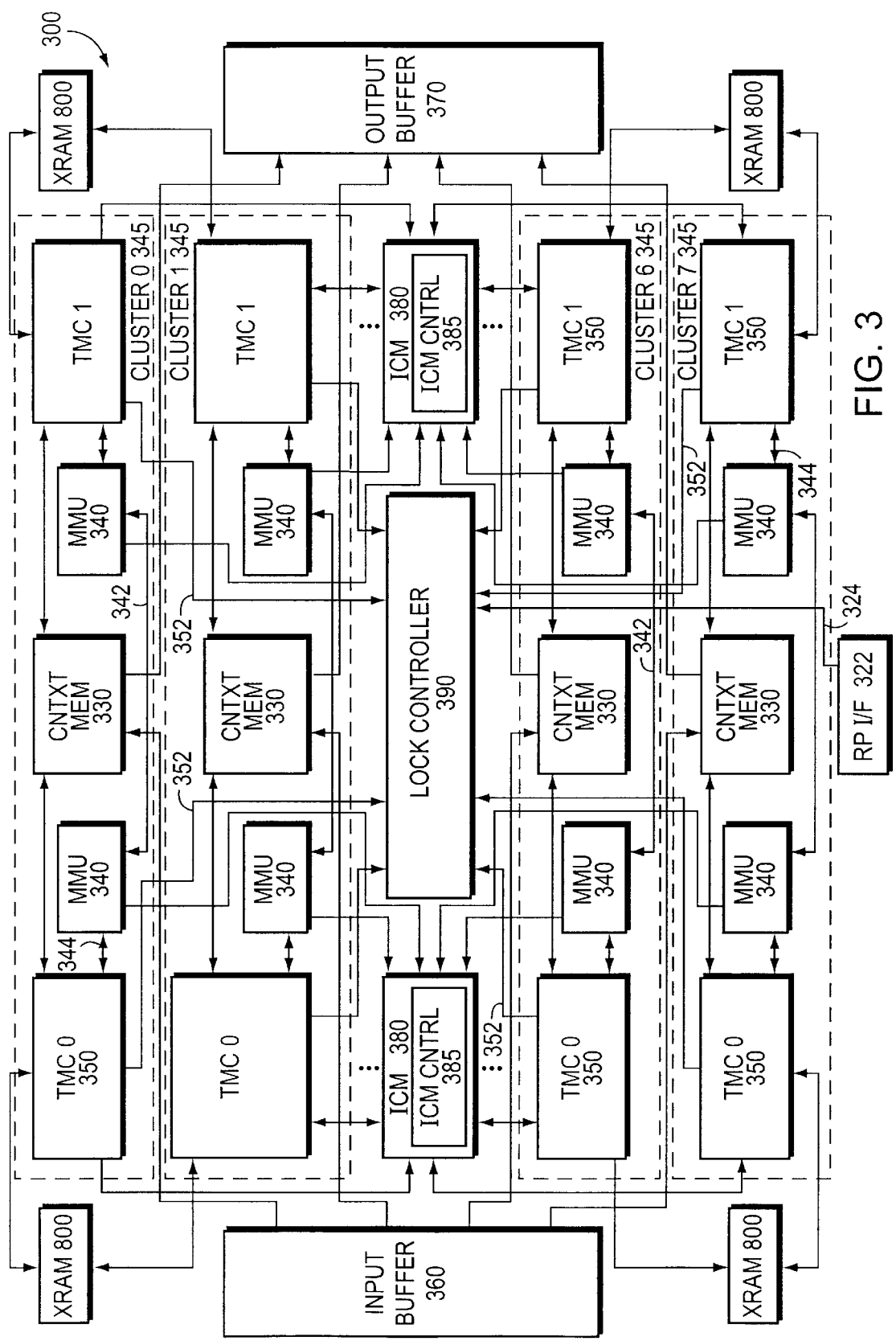
FIG. 3 is a schematic block diagram of the arrayed processing engine comprising a symmetric multiprocessor system configured as a multidimensioned systolic array.

FIG. 3 is a schematic block diagram of the programmable processing engine 300 which comprises an array of processors embedded between input and output header buffers with a plurality of interfaces 310 from the array to partitions of an external memory. The external memory stores non-transient data organized within data structures for use in processing the transient data. The non-transient data typically includes "table" data contained in forwarding and routing tables, statistics, access filters, encryption keys and/or queuing information. The transient data enters and exits the engine via 100 MHz 64-bit input and output data interfaces of the BQU 210. A remote processor interface (I/F) 322 provides information, such as instructions and data, from a remote processor to the processors and buffers over a maintenance bus having multiplexed address/data lines.

The processing engine 300 may comprise a symmetric multiprocessor system having a plurality of processors 350; moreover, the processors may be arrayed into multiple rows and columns, and further configured as a multidimensioned systolic array. In the illustrative embodiment, the processors are arrayed as eight (8) rows and two (2) columns in an 8×2 arrayed configuration that is embedded between an input buffer 360 and an output buffer 370. However, it should be noted that other arrangements, such as 4×4 or 8×1 arrayed configurations, may be advantageously used with the present invention. As noted herein, a single processor supporting multiple threads of execution can take advantage of the invention. The processors of each row are connected to a context memory 330 and a plurality of memory management units (MMUs 340); collectively, these elements of the row are organized as a cluster 345.

Specifically, the processors of each row are configured to sequentially execute operations on the transient data loaded by the input buffer 360, whereas the processors of each column operate in parallel to perform substantially the same operation on the transient data, but with a shifted phase. Sequencing circuitry of the input buffer 360 controls the processors of each pipeline by ensuring that each processor completes processing of current transient data prior to loading new transient data into the pipeline at a new phase. In general, a new phase of processing is started, i.e., a context switch is performed, when all of the processors finish processing their current context and new, incoming context is completely received by the input buffer. An example of a system for controlling phase processing that may be suitable for use with the present invention is described in copending and commonly-owned U.S. patent application Ser. No. 09/106,246 titled Synchronization and Control System for an Arrayed Processing Engine, which application is hereby incorporated by reference as though fully set forth herein.

Because they perform similar functions, the columned processors require similar non-transient "table" data. Therefore, the external memory is partitioned into a plurality of Ext Mem resources 400, each of which is dedicated to a respective column of processors. A plurality of internal memories 380, each dedicated to a respective column of processors, is also located on the processing engine 300. The Ext Mem 400 and internal column memory (ICM) 380 are configured with non-transient table data needed to support the similar function performed by the columned processors.

Specifically, each processor is a customized, single-threaded microcontroller (TMC) 350 having a dense structure that enables implementation of similar processors on an application specific integrated circuit. The present invention may apply to any number of processors within a column of the arrayed engine and, in fact, to a single processor with multiple threads of execution, each of which attempts to access a shared resource. The TMC 350 is preferably a pipelined processor that includes, inter alia, a plurality of arithmetic logic units (ALUs) and a register file having a plurality of general purpose registers that store intermediate result information processed by the ALUs.

The TMC processors 350 of each cluster 345 execute operations on transient data loaded into the context memory 330 by the input buffer 360, whereas the processors of each column operate in parallel to perform substantially the same operation on the transient data, but with a shifted phase. The context memory 330 stores transient "context" data (e.g., packet/frame data) flowing through the cluster that is unique to a specific process, along with pointers that reference data structures and tables stored in, e.g., Ext Mem 400 for use by the TMC 350.

Each Ext Mem 400 is coupled to an external memory (XRAM) controller 800 which, in the illustrative embodiment, is preferably embodied as a 200 MHz external memory interface coupled to a column of processors. The XRAM controller 800 is configured to enable columned processor access to the non-transient data stored in the external column memory. The shared Ext Mem 400 accessed by the processors may further comprise entries of data structures, such as tables, that are constantly updated and accessed by the processors of each column. An example of such a table structure is the FIB table used by the processing engine to perform forwarding operations.

Figure 4:
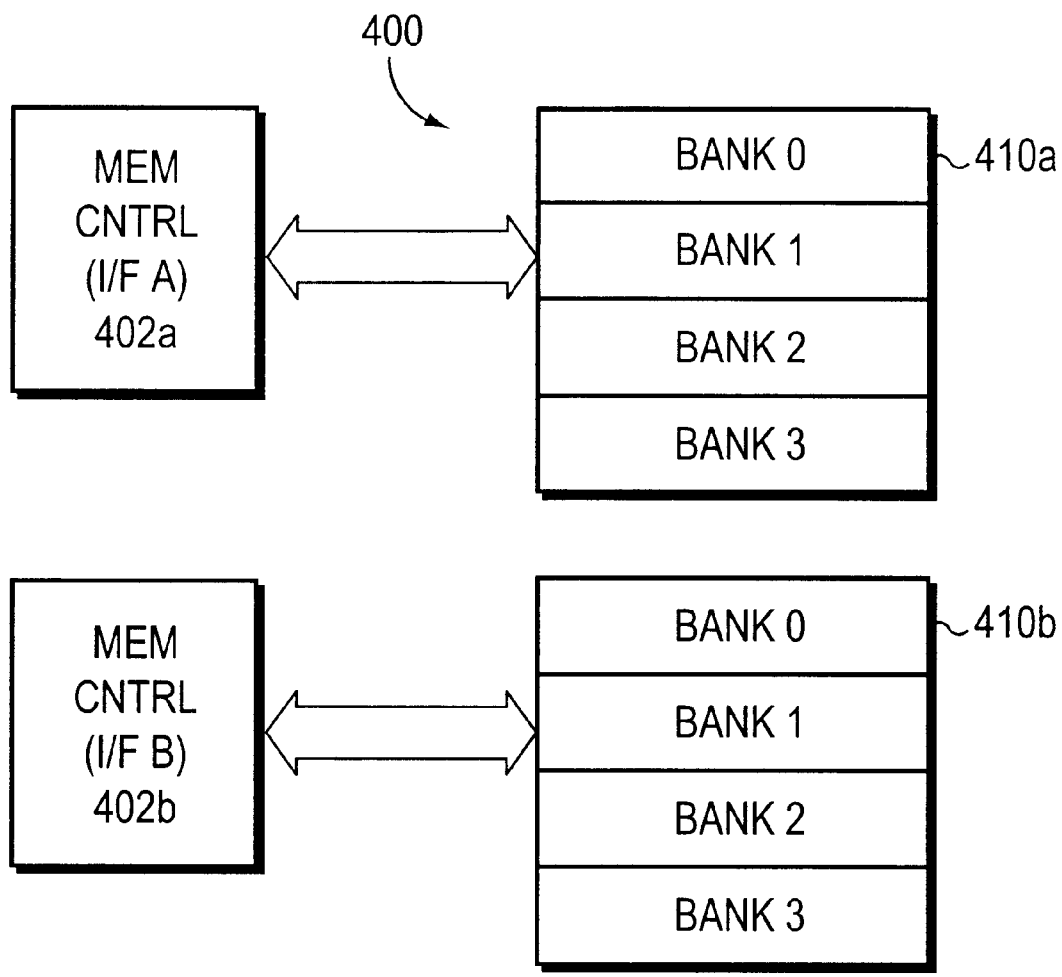
FIG. 4 is a schematic block diagram of an external memory resource comprising at least one synchronous dynamic random access memory (SDRAM) array organized into a plurality of banks.

FIG. 4 is a schematic block diagram of Ext Mem 400 comprising at least one synchronous dynamic random access memory (SDRAM) array organized into a plurality of (e.g., 4) banks (Banks 0-3). In the illustrative embodiment, the Ext Mem 400 comprises a plurality of memory modules or arrays 410 that is accessible by a column of processors within the processing engine. Specifically, each column of processors may access two external memory arrays 410a,b, wherein each array may comprise a plurality of memory devices controlled by a memory controller. Thus, the XRAM 800 may comprise two memory controllers (MEM CNTRL) 402a,b. The memory arrays logically form a single address space, but they operate independently to avoid contention among the controllers. Illustratively, there are preferably eight (8) independent banks of memory available to a column of processors. As described herein, this arrangement is significant to a streaming mode of operation wherein interleaving occurs between the banks and the arrays.

In the illustrative embodiment, approximately 70 nsecs are required to completely cycle through a random access operation to a memory bank of the SDRAM resource operating at, e.g., 100 MHz. A first random access operation to, e.g., Bank 0 at a particular time t obviates a next random access to Bank 0 for a predetermined period of time (t+x), primarily because the bank must "precharge"(i.e., finish the current operation and configure the storage elements for the next operation). In the case of a random read access operation to the bank, an active command is issued during a first cycle. The active command functions as a conventional read access strobe (RAS) command that "opens" the bank. The active command is followed by two idle cycles and a read (or write) command cycle, the latter command functioning as a conventional column access strobe (CAS) command. Essentially, the active command selects a row of the SDRAM bank whereas the read (or write) command selects a column of the bank.

One idle cycle after the read (or write) command a parameter may be specified that "closes" the bank, primarily because the next operation may be directed to an address location that is not in the general area of the current operation. The parameter that closes the bank is an auto precharge (APC) attribute. The APC attribute is issued as part of the read (or write) command but does not immediately close the bank after that command access because of the time it takes for the access (read or write operation) to complete. Although the APC attribute is specified during the read command cycle, its function does not take effect until one cycle after that command cycle. Therefore, the minimum time required for a random access to a location in the memory bank is approximately seven (7) cycles before another random access operation can be issued to that bank. It should be noted that the RAS, CAS and APC are characteristics of conventional SDRAMs.

Enhanced utilization of the SDRAM memory resource having the characteristics described above is achieved by scheduling the processors 350 of the symmetric multiprocessor engine 300 in a manner such that they do not access the same bank of the memory resource at the same time. As noted, an approach for obviating the minimum cycle requirement for accessing a bank of the SDRAM resource using the illustrative processing engine is to stagger the phases of execution among the processors of a column such that two processors do not access the same bank at the same time. However, multiple accesses may be performed to multiple banks at the same time.

One way to issue multiple accesses to a contiguous address space (e.g., one bank) in an efficient manner is to not close the bank. This approach to accessing multiple data items from a contiguous block of storage (such as a bank or a series of contiguous banks) results in a series of additional read commands being issued with only the last of the read commands having the APC attribute specified. Instead of 7 cycles for a single read access, this approach consumes approximately fourteen (14) cycles, assuming a total of 5 consecutive read commands which may also be extended. For example, a processor in a first row cannot reaccess the same bank for 14 times the number of rows and, therefore, cannot begin processing a next packet until that time. Yet "tying up" a particular bank for such a long duration destroys the staggered phase relationship among the processors of a column, i.e., with respect to their accesses to the memory resource without contention.

In other words, use of an extended memory access transaction to a particular bank disrupts the phased relationship among processors 350 of a column in the processing engine, thus adversely affecting performance of the engine 300. In fact, an access that extends beyond the defined phase period allocated for each processor of a column is not permissible in the symmetric multiprocessor systolic array described herein. Therefore, the approach of keeping a bank open and streaming data for an extended period of time does not apply to the SDRAM resource 400. The present invention is directed to a dynamic address mapping technique that enables fast and efficient accesses to contiguous storage locations of a memory resource using a symmetric processing engine arrayed in a manner as described above. Moreover, the dynamic address mapping technique eliminates contention to the memory resource by processors of a column within the engine.

According to the invention, two logical-to-physical address mapping operation modes are defined that may be simultaneously used by the processors 350 of the arrayed processing engine 300 to present a single contiguous address space for accessing individual memory locations, as well as a plurality of memory locations organized as a "memory string", within the memory resources. In the illustrative embodiment, one of the two operational modes may be selected for accessing the external SDRAM memory resource 400, wherein the selected mode depends upon the application executed by the processors of the processing engine. The two operational modes include (i) bank select mode that facilitates random lookup operations (i.e., involving small blocks of data), and (ii) stream mode that facilitates data streaming operations (i.e., involving large blocks of data).

Bank select mode is a dynamic addressing mode (as opposed to a static mode of a particular processor chip) that is preferably invoked by asserting, within a request, a particular high-order bit of an address. It should be noted, however, that other means of invoking this addressing mode may be utilized, such as asserting a bit of an instruction or defining a bit within an address translation table. The bank used is then indicated by high-order bits of the address. Stream mode is invoked by the opposite value of the same bit used to indicate bank select mode with the result that requested data is "streamed" by accessing various banks to acquire the data. The low-order bits of the address indicate the starting bank to be used to transfer data and the length of the transfer indicates how many consecutive banks to access to acquire the data. The dynamic address mapping technique described herein enables a processor to utilize both addressing modes simultaneously in a manner that eliminates or substantially reduces contention for the memory bank resource.

An example of random lookup operations includes a series of read operation accesses directed to a FIB table having relatively short entries wherein each read access acquires a plurality of bytes of data at a particular location within the table. The result of the read from a first table is used to compute the entry to be read from a second table, the result from the second table is used to compute the entry to be read from a third table, and so on. Each random read operation may occur within different banks of the memory resource or within the same bank of that resource, the latter random access being scheduled at a time when there is no contention among the other processors of the column for that particular bank. In general, execution of random lookup operations in bank select mode should not result in contention among the processors of each column.

Figure 5:
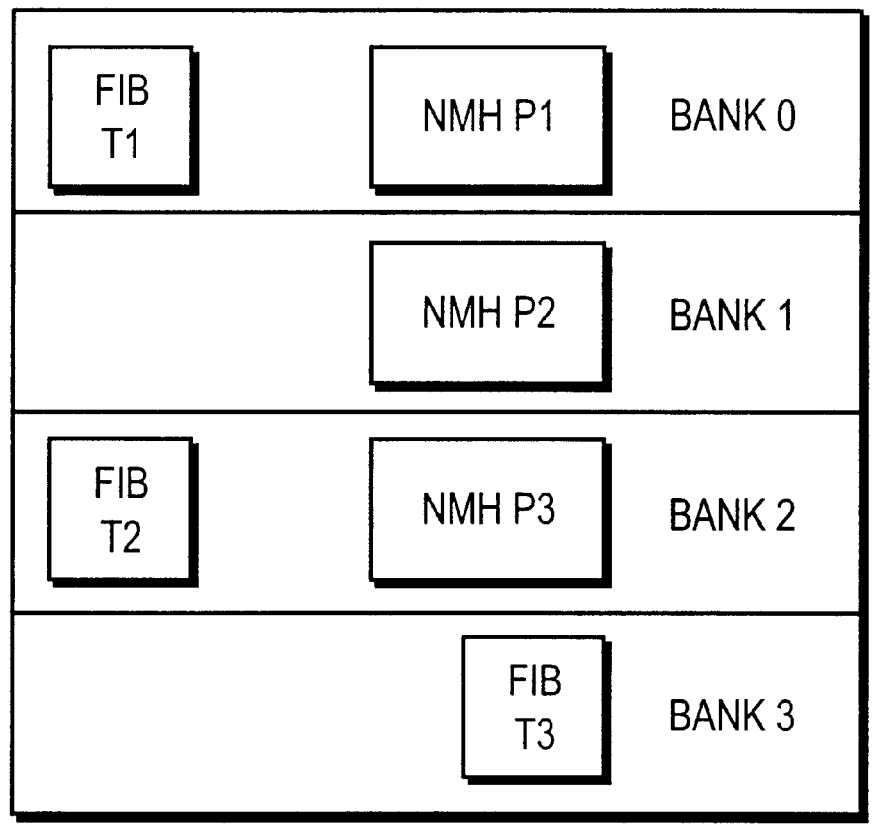
FIG. 5 is a schematic block diagram of an embodiment of the SDRAM array that may be advantageously used with bank select and stream modes of a novel address mapping technique in accordance with the present invention.
Figure 6:
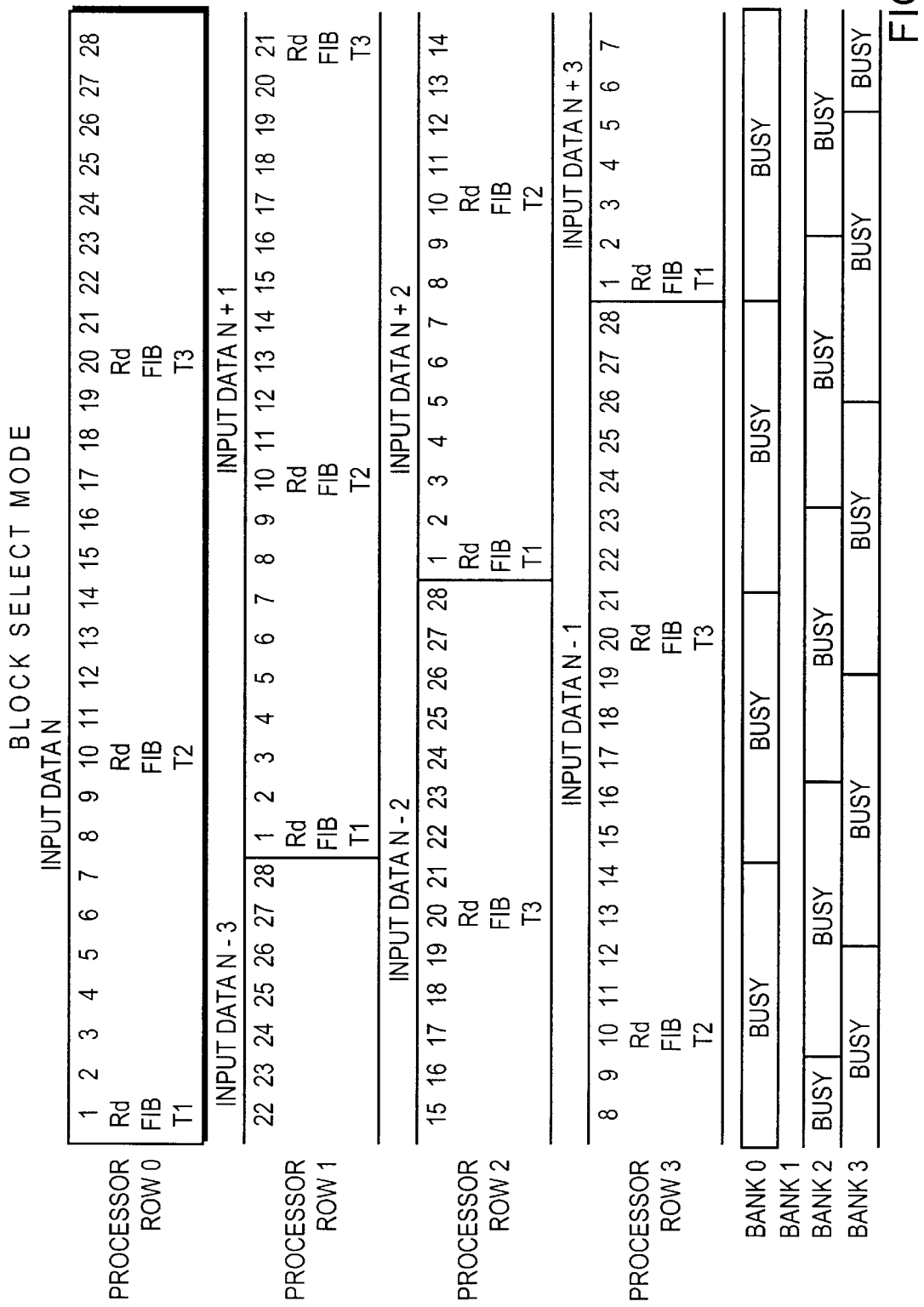
FIG. 6 is a diagram illustrating staggered accesses from processors to the SDRAM array over a context time in accordance with the bank select mode of the invention.

FIG. 5 is a schematic block diagram of an embodiment of a SDRAM array 500 that may be advantageously used with bank select and stream modes of the novel dynamic address mapping technique. A plurality of FIB tables (e.g., FIB T1–3) each having relatively short entries, is provided to accommodate "steps" of random lookup operations in bank select mode. The portion of memory consumed by each table is entirely contained within a bank of the memory resource; that is, each FIB table does not transcend multiple banks within the memory resource but rather is entirely located within a single bank. Execution of the lookup operations results in a first step of a FIB table lookup occurring at a FIB T1 located entirely in, e.g., Bank 0. Similarly, second and third steps of the lookup are directed to FIBs T2 and T3 located in Banks 2 and 3, respectively. By placing each table entirely within a bank, the novel technique ensures that a subsequent processor within a column does not contend with a previous processor of that column when accessing a particular table in a bank of the memory resource. Notably when in bank select mode, a single bank is only opened for the duration of a single access (e.g., 7 cycles) so as not to interfere with the staggered phase of execution arrangement among the processors of a column with respect to the shared resource. FIG. 6 is a diagram illustrating the staggered accesses from the processors to the shared array resource over a context time in accordance with the bank select mode of the invention.

In contrast, an example of a data streaming operation involves the use of an interface table having relatively long entries. Assume a packet arrives at the switch 200 through an interface card 240 and certain data (e.g., interface parameters) are needed pertaining to that interface, such as the type and speed of a link coupled to the interface. A plurality of bytes of data is necessary to acquire such a stream of interface parameters. Another example of a stream mode operation involves rewriting of a MAC header wherein a plurality of data bytes (i.e., a "stream of data") is required to perform this operation. A problem arises, however, when accessing this type of table if it resides within a single bank. For example assume a new MAC header table is entirely located within a single bank, such as Bank 2, and a stream of data (e.g., 16 bytes) must be retrieved from the table by a processor during its phase of execution. Yet the duration of an execution phase is not long enough to retrieve the entire 16 bytes. Moreover, as noted, the bank cannot be opened for longer than the 7 cycles because it would interference with other processors vying for access to that resource.

Figure 7:
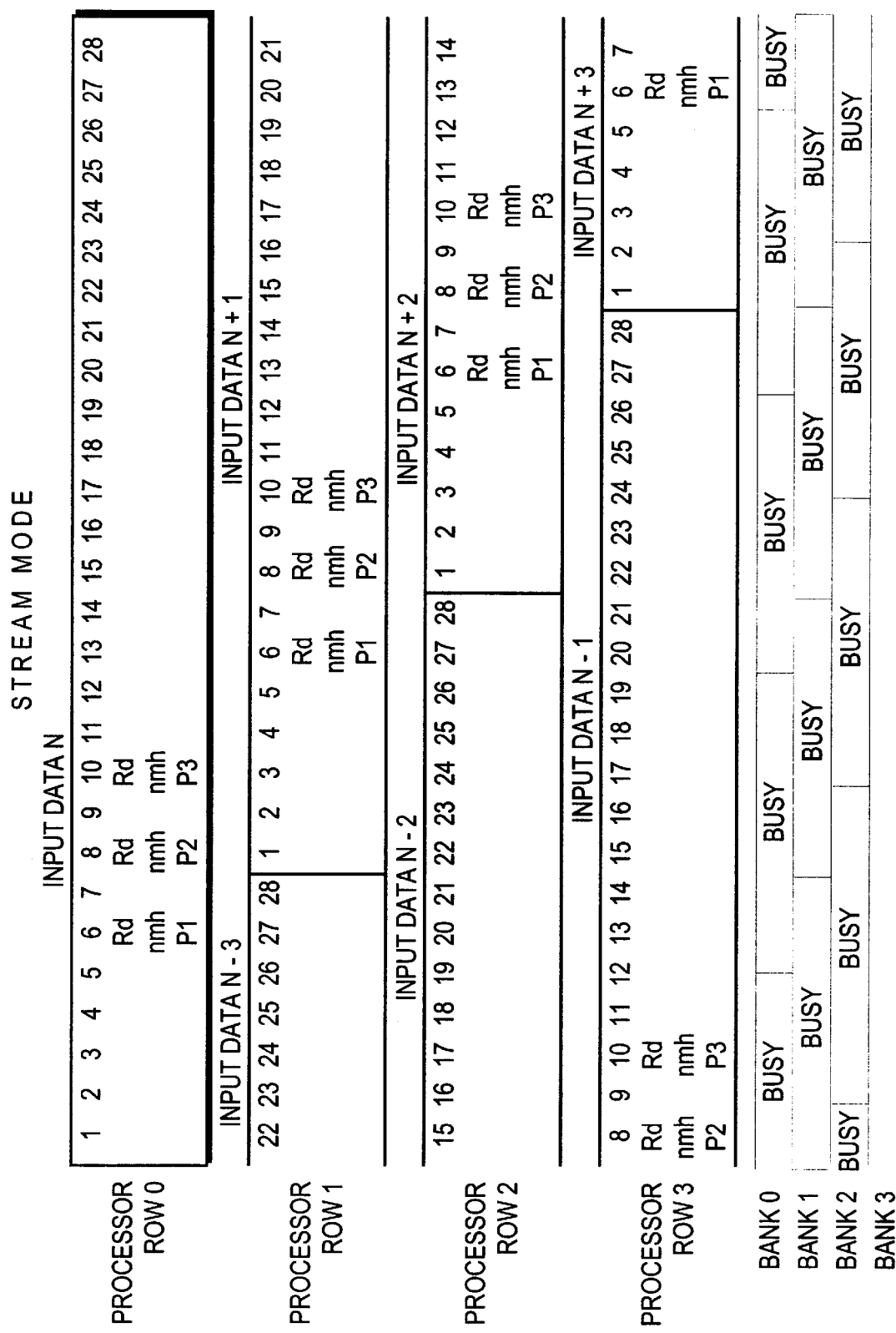
FIG. 7 is a diagram illustrating staggered accesses from processors to the SDRAM array over a context time in accordance with the stream mode of the invention.

According to the present invention, accesses to a stream of data are resolved by distributing portions of the new MAC header table among various banks of the resource. That is, the new MAC header table may be apportioned into three (3) new MAC header table (NMH) portions P1–3. These distributed portions are organized such that a first part of the streaming data is retrieved from NMH P1 in Bank 0. Similarly, a second part of the streaming data is retrieved from NMH P2 in Bank 1 and a third part of the data is retrieved from NMH P3 located in Bank 2. Thus, the portions of memory consumed by the MAC header table having relatively long entries that are accessed in stream addressing mode spans multiple banks of the resource.. Accesses to the distributed portions of the table may be scheduled in a manner that does not conflict among the processors of a column. FIG. 7 is a diagram illustrating the staggered accesses from the processors to the shared array resource over a context time in accordance with the stream mode of the invention.

Another problem associated with stream mode addressing involves the overhead required to compute addresses of locations involved in the "streaming" retrieval of data. In accordance with another aspect of the present invention, the novel address mapping technique computes these addresses in an efficient manner. Specifically, the address mapping technique pertains to a virtual (logical) to physical translation arrangement wherein the resulting physical address also includes a particular bank of the resource. The technique involves a translation of an address that is generated by a processor (i.e., virtual address) to an address that selects an external resource and bank (physical address). The novel technique also provides the ability to effect translation simultaneously and dynamically ("on-the-fly") in accordance with the bank select and stream modes. Moreover, the novel address mapping technique provides multiple types of translation within stream mode depending upon the characteristics of the memory resource being optimized.

Figure 8:
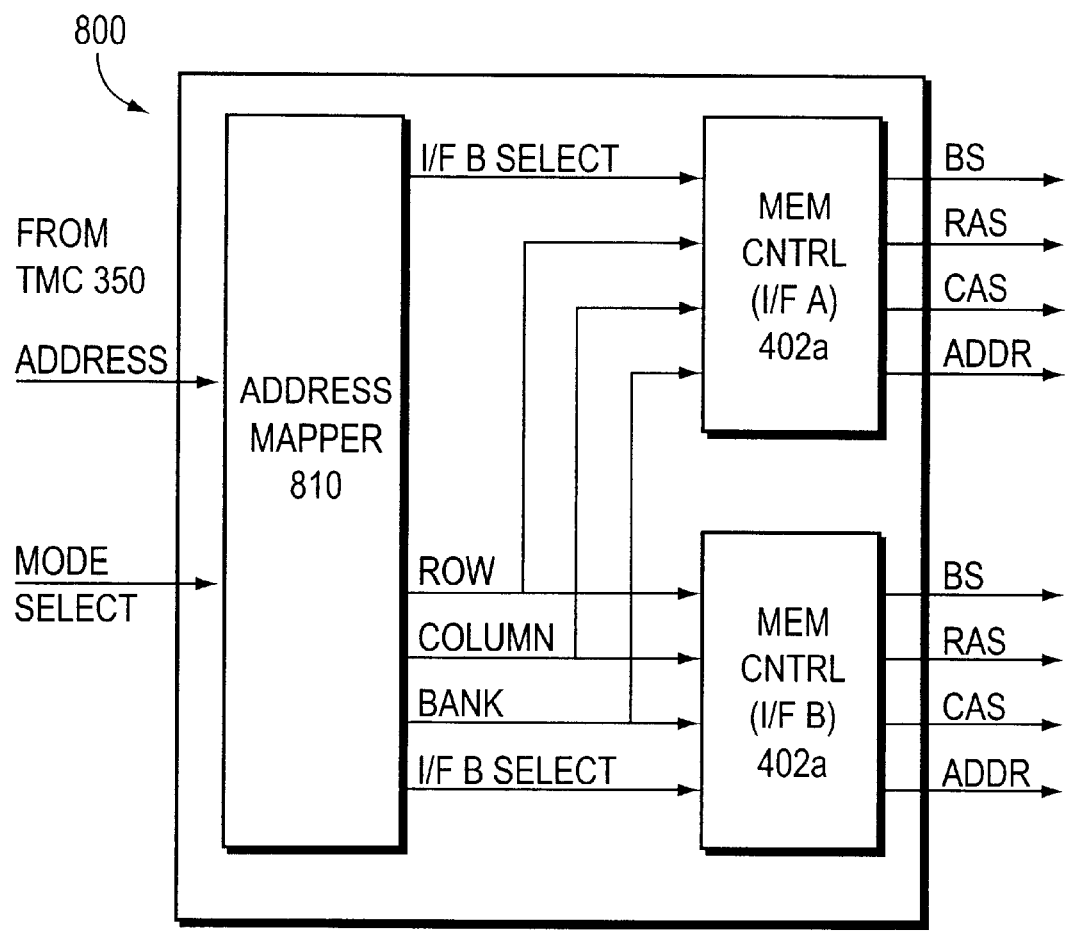
FIG. 8 is a schematic block diagram of an external memory controller that may be advantageously used with the address mapping technique of the present invention.

When issuing a memory access operation, a processor typically provides an address associated with a particular access (read/write) operation to a memory resource. The address comprises a plurality of bits that generally do not specify a particular bank of the memory resource. In accordance with the present invention, the novel address mapping technique is performed by the XRAM controller 800 associated with the memory array 410, rather than by a processor 350. FIG. 8 is a schematic block diagram of the XRAM controller 800 comprising address mapping logic (i.e., address mapper 810) coupled to the memory controllers MEM CNTRL 402*a,b*. The address mapper 810 may be implemented as a plurality of hardware registers and combinational logic configured to produce sequential logic circuits. The address mapper receives relevant address bits and mode select bits from the TMC processors (as well as any configuration bits) and converts them into interface (I/F) select, bank select, row and column bits, as described herein. In particular, the controller selects certain bits from the 32-bit address, e.g., address bits <31:0>, to determine the particular bank and array to which the memory access operation is directed.

FIG. 9 illustrates a logical-to-physical computation in accordance with bank select mode addressing of the present invention. In the illustrative embodiment, the total memory capacity of the memory array 410 is preferably 16 megabytes (MB), with each of the 4 banks defined by a 4 MB boundary. According to the bank select mode of the present invention, two bits of the 32-bit address may be used to specify the particular bank select; these two bits are preferably address bits <23:22>. Twenty bits, e.g. address bits <21:0>, are needed to reference each location within a 4 MB bank. In addition, since there are preferably two memory arrays 410*a,b*, and thus two memory controllers 402*a,b*, per column of processors, one bit, e.g., address bit <24> is needed to select a memory controller interface (I/F).

Moreover, certain bits of the 32-bit address are allocated for designating the row and column of the physical SDRAM devices. The number of bits used to specify each row and column depends upon the type of memory devices utilized. In the illustrative embodiment, the memory devices are logically 4-bytes wide and, therefore, the two low-order bits of address bits <21:0> are not used for addressing. As a result, 9 bits, e.g., address bits <10:2> may be allocated for specifying a column and 11 bits, e.g., address bits <21:11> may be allocated for specifying a row. Of course, it is understood that other permutations of row and column addressing may be used depending on the type of memory devices utilized, and does not affect system performance.

In the illustrative embodiment, processor addresses are mapped to physical memory starting at MEM CNTRL I/F A, Bank 0 and sequentially continuing until all addresses of that bank are consumed. Mapping then proceeds to the beginning of I/F A, Bank 1 and continues until all addresses of that bank are consumed. At this point, all addresses of I/F A are completely consumed. Mapping then continues starting at MEM CNTRL I/F B and proceeding sequentially until all addresses of those banks are consumed. In the previous example, then, an additional address bit <24> could be used to select between the two memory interfaces A and B. Notably, an entire bank is exhausted with respect to the mapping technique prior to proceeding to another bank. Of course, the order of accesses per bank per module can be changed such that Bank 0 on I/F A is completely consumed followed by Bank 0 on I/F B; once that latter bank is totally consumed, the mapping may progress to Bank 1 on I/F A.

According to the stream mode aspect of the present invention, the novel mapping technique may specifying "jumping" among the memory banks as addresses increase for is each small unit of access (e.g., 4 bytes). For example, a first memory access of 7 cycles is directed to a first bank (Bank 0) of a first memory array (e.g., I/F A) wherein 4 bytes of information are accessed. The next contiguous access is directed to Bank 1 where another 4 bytes of information are accessed. In one embodiment, this sequence of contiguous accesses continues through Banks 2 and 3 of I/F A and then proceeds to Banks 0–3 of a second memory array (e.g., I/F B). In an alternate embodiment, the novel streaming addressing mode technique may further jump from Bank 0 on memory I/F A to Bank 0 on memory I/F B, then to Bank 1 on memory I/F A to Bank 1 on memory I/F B. The present invention enables selection of the particular "jumping" configuration of the shared memory resource.

FIG. 9 also illustrates logical-to-physical computations in accordance with stream mode addressing of the present invention. There are preferably various types of stream mode addressing, each defining a different type of address mapping to the physical memory resources. In the illustrative embodiment, a configuration register is utilized to define the type of stream mode mapping configured for a particular column of processors accessing its external memory. Alternatively, higher-order address bits, bits from a processor instruction or bits defined within an address translation table could be used to select the mapping for that access. For example, stream mode (2) is optimized for 32-bit accesses to the external memory. In this particular mode, two bits, e.g., address bits <3:2>, of a 32-bit address are used for bank select, while address bit <4> is preferably used as an interface select bit. Column and row bits are preferably further defined as address bits <13:5> and <24:14>, respectively.

Operationally, mapping of stream mode (2) starts at physical address 0 and continues sequentially though Banks 0–3 of memory I/F A prior to "jumping" to Banks 0–3 on memory I/F B before returning to Bank 0 on memory I/F A. Notably, another stream mode (such as stream mode 3, not shown) is generally similar to stream mode (2) with the exception that it is directed towards 64-bit accesses. As such, each of the defined address ranges is shifted by one so that address bits <4:3> specify the bank select and address bit <5> specifies the interface select to enable 8-byte accesses per bank before jumping to the next contiguous location in a subsequent bank. In this case, a bank is unavailable for 9 cycles which defines the minimum number of cycles before the next processor in the column can access that same bank.

Stream mode (0) defines a mapping arrangement that "jumps" between similar banks on different interfaces (e.g., Bank 0 on I/F A to Bank 0 on I/F B, Bank 1 on I/F A to Bank 1 on I/F B, etc.). Mapping for stream mode (0) is optimized for 32-bit addresses and organized such that the bank select bits are preferably address bits <4:3> and the I/F select bit is preferably address bit <2>. The derived row and column mapping for this mode is the same as for stream mode (2). In stream mode (0) the lowest address is in Bank 0 of memory I/F A, but the next 4-byte address changes the I/F select bit to direct that access to Bank 0 on memory I/F B.

Stream mode (4) is also optimized for 32-bit accesses and organized such that only half the memory is used as contiguous address space. That is, the 4 banks of one memory array are entirely mapped and consumed prior to jumping to the 4 banks of the other memory array. To that end, the bank select bits are preferably address bits <3:2>, the I/F select bit is preferably address bit <24> and the row bits are preferably address bits <23:13> while the column bits are preferably address bits <12:4>. The addressing mode specifies accessing 4-byte memory locations contiguously across Banks 0–3 on memory I/F A until all the address locations on that array are consumed; at that point, the banks of memory I/F B may be accessed. This addressing mode may further be employed to reserve the second memory interface and its banks for bank select mode addressing.

Advantageously, the inventive technique provides a means for eliminating contention among synchronized parallel processors for various table organizations in a manner that achieves maximum system throughput. Bank select addressing mode, by itself, has severe contention problems for direct long accesses and additional processor overhead if a processor must apportion long accesses into multiple shorter accesses. Moreover, an address mapping technique that exclusively uses low-order address bits to select a bank is non-deterministic, resulting in contention and cannot be tuned.

Although software may perform mapping to the banks via processor instructions, the novel (hardware) address mapping technique has the advantage that it is transparent to real-time software and eliminates processor instructions that may be wasted by dynamically computing non-contiguous memory addresses. In addition, the technique supports tables of various widths that can be accessed directly by software without reducing system throughput and without requiring system software to dynamically compute memory addresses for what should be viewed as contiguous memory. The inventive technique also allows the use of SDRAM memory resources where significantly more expensive, and lower density, SSRAM might otherwise be required.

While there has been shown and described an illustrative embodiment of a dynamic address mapping technique that eliminates contention to memory resources of a symmetric multiprocessor system having a plurality of processors arrayed as a processing engine, it is to be understood that various other adaptations and modifications may be made within the spirit and scope of the invention. For example, in another embodiment of the present invention, the jumping arrangement may be restricted to a portion of the banks on a memory array. Such restriction enables one portion of the memory array to be exclusively reserved for stream mode while another portion of the memory array to be reserved exclusively for bank select mode, thereby avoiding contention between the two modes.

Figure 10:
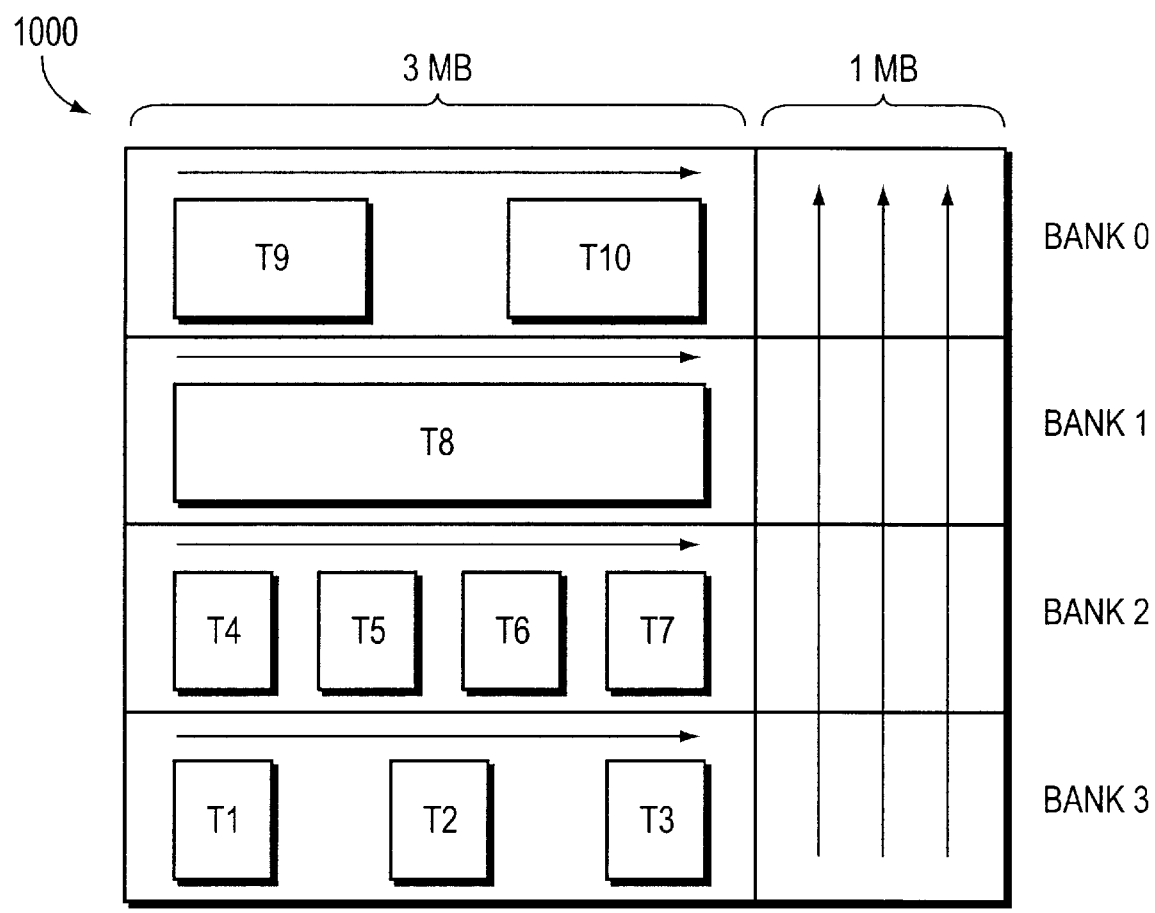
FIG. 10 is a schematic block diagram of a restricted jumping embodiment of the SDRAM array that may be advantageously used with bank select and stream mode addressing in accordance with the present invention.

FIG. 10 is a schematic block diagram of a restricted jumping embodiment of a SDRAM array 1000 configured to support bank select and stream mode-addressing. As noted, the memory array is apportioned into 4 banks, each having a storage capacity of 4 MB; however, in this embodiment, 3 MB of each bank are used for storing entire tables accessible in bank select mode. Thus, tables T1–3 are resident in Bank 3, tables T4–7 are resident in Bank 2, table T8 is located in Bank 1 and tables T9–10 are located in Bank 0. The remaining 1 MB per bank is reserved for stream mode mapping across the banks as addresses decrease (or increase). Note that in bank select mode, addresses increase horizontally (e.g., from left to right) whereas in stream mode addresses increase vertically (e.g., from bottom to top).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A dynamic address mapping method for eliminating contention to a memory resource of a symmetric multiprocessor system having a plurality of processors arrayed as a processing engine, the method comprising the steps of:

providing a bank select mode that enables logical-to-physical address mapping operations by a first processor to select a bank of the memory resource storing a first data structure having short entries, each short entry comprising data accessible by the first processor at a particular location of the bank; and providing a stream mode that enables logical-to-physical address mapping operations by a second processor to select a bank from among a plurality of banks of the memory resource storing a second data structure having long entries, each long entry comprising data accessible by the second processor at a plurality of locations among the plurality of banks, wherein the bank select and stream modes are simultaneously provided to the processors of the arrayed processing engine to thereby present a single contiguous address space for accessing particular memory locations as well as a plurality of memory locations within the memory resource.

2. The dynamic address mapping method of claim 1 wherein the bank select mode uses high-order address bits to select the bank of the memory resource for access by the first processor.

3. The dynamic address mapping method of claim 2 wherein the stream mode uses low-order address bits to select the bank of the memory resource for access by the second processor.

4. The dynamic address mapping method of claim 2 wherein the step of providing the bank select mode comprises the step of invoking the bank select mode through the use of a high-order address bit.

5. The dynamic address mapping method of claim 2 wherein the step of providing the bank select mode comprises the step of invoking the bank select mode through the use of an asserted bit of an instruction.

6. The dynamic address mapping method of claim 2 wherein the step of providing the bank select mode comprises the step of invoking the bank select mode through the use of a defined bit within an address translation table.

7. The dynamic address mapping method of claim 3 wherein the step of providing the stream mode comprises the step of invoking the stream mode through the use of a high-order address bit.

8. The dynamic address mapping method of claim 3 wherein the step of providing the stream mode comprises the step of invoking the stream mode through the use of an asserted bit of an instruction.

9. The dynamic address mapping method of claim 3 wherein the step of providing the stream mode comprises the step of invoking the stream mode through the use of a defined bit within an address translation table.

10. The dynamic address mapping method of claim 3 wherein the processors are arrayed into multiple rows and columns, and wherein the step of providing the stream mode comprises the step of providing various types of stream mode addressing, wherein each type defines a different type of address mapping to the memory resource.

11. The dynamic address mapping method of claim 10 wherein the step of providing various types of stream mode addressing comprises the step of defining the type of stream mode address mapping using a configuration register.

12. The dynamic address mapping method of claim 10 wherein the step of providing various types of stream mode addressing comprises the step of defining the type of stream mode address mapping using higher-order address bits.

13. The dynamic address mapping method of claim 10 wherein the step of providing various types of stream mode addressing comprises the step of defining the type of stream mode address mapping using bits from a processor instruction.

14. The dynamic address mapping method of claim 10 wherein the step of providing various types of stream mode addressing comprises the step of defining the type of stream mode address mapping using bits defined within an address translation table.

15. The dynamic address mapping method of claim 3 wherein each data structure is a table.

16. The dynamic address mapping method of claim 15 wherein the first processor and the second processor are the same processor.

17. The dynamic address mapping method of claim 16 wherein the same processor has multiple threads of execution.

18. The dynamic address mapping method of claim 1 wherein the step of providing a bank select mode that enables logical-to-physical address mapping operations comprises the steps of:

receiving address bits and mode select bits from the first processor at an address mapper; and converts the received bits into interface select, bank select, row and column bits.

19. The dynamic address mapping method of claim 18 wherein the step of providing a stream mode that enables logical-to-physical address mapping operations comprises the steps of:

receiving address bits and mode select bits from the second processor at an address mapper; and converts the received bits into interface select, bank select, row and column bits.

20. The dynamic address mapping method of claim 19 wherein the first processor and the second processor are the same processor.

* * * * *